(12) United States Patent
Harding et al.

(10) Patent No.: US 6,944,698 B2
(45) Date of Patent: Sep. 13, 2005

(54) METHOD AND APPARATUS FOR PROVIDING BUS ARBITRATIONS IN A DATA PROCESSING SYSTEM

(75) Inventors: W. Riyon Harding, Richmond, VT (US); Thomas Michael Lepsic, Jeffersonville, VT (US); Sebastian Theodore Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 10/064,379

(22) Filed: Jul. 8, 2002

(65) Prior Publication Data

US 2004/0006660 A1 Jan. 8, 2004

(51) Int. Cl.$^7$ ............................................. G06F 13/362
(52) U.S. Cl. ...................................... 710/113; 709/138
(58) Field of Search ........................... 710/113; 709/138

(56) References Cited

U.S. PATENT DOCUMENTS

| | | | |
|---|---|---|---|
| 5,072,369 A | | 12/1991 | Theus et al. |
| 5,416,910 A | | 5/1995 | Moyer et al. |
| 5,471,590 A | * | 11/1995 | Melo et al. ................. 710/108 |
| 5,481,680 A | * | 1/1996 | Larson et al. ............... 710/112 |
| 5,506,971 A | | 4/1996 | Gullette et al. |
| 5,533,204 A | * | 7/1996 | Tipley ......................... 710/108 |
| 5,659,710 A | | 8/1997 | Sherman et al. |
| 5,687,327 A | | 11/1997 | Arimilli et al. |
| 5,802,576 A | * | 9/1998 | Tzeng et al. ................ 711/146 |
| 5,893,921 A | | 4/1999 | Bucher et al. |
| 5,900,017 A | | 5/1999 | Genduso et al. |
| 6,073,199 A | * | 6/2000 | Cohen et al. ............... 710/113 |
| 6,260,118 B1 | | 7/2001 | Genduso et al. |

\* cited by examiner

*Primary Examiner*—Tim Vo
*Assistant Examiner*—Christopher Daley
(74) *Attorney, Agent, or Firm*—Richard A. Henkler; Dillon & Yudell LLP

(57) ABSTRACT

A method and apparatus for providing bus arbitrations in a multiprocessor system is disclosed. A computer system includes a common bus that is shared by multiple cores, such as processors. A history of bus requests for the common bus made by the cores is stored in a bus request history table. In response to bus request made by the cores, the common bus is arbitrated according to information stored in the bus request history table by an arbiter.

14 Claims, 4 Drawing Sheets

Fig. 4

| Current Sequence Number (25) | Processor Sequence (26) | Next Sequence Number (27) | Number of Misses (28) | Actual Processor Sequence (29) |
|---|---|---|---|---|
| | | | | |

Fig. 5

| Current Sequence Number (25) | Processor Sequence (26) | Next Sequence Number (27) | Number of Misses (28) | Actual Processor Sequence (29) |
|---|---|---|---|---|
| 1 | CACBA | 1 | 0 | CACBA |
| 2 | BABDH | 3 | 1 | BABDE |
| 3 | DADGE | 5 | 0 | DADGE |
| 4 | HEHAC | 9 | 2 | HEHAB |
| 5 | ACFEG | 1 | 0 | ACFEG |

METHOD AND APPARATUS FOR PROVIDING BUS ARBITRATIONS IN A DATA PROCESSING SYSTEM

BACKGROUND OF THE INVENTION

1. Technical Field

The present invention relates to data processing systems in general, and in particular to bus arbitration within a data processing system. Still more particularly, the present invention relates to a method and apparatus for providing bus arbitrations in a data processing system.

2. Description of the Related Art

A multiprocessor system is a data processing system having two or more processing units that are capable of concurrent execution. By carrying out multiple processes simultaneously, a multiprocessor system can provide tremendous speed improvement over a single processor system. Within a multiprocessor system, a number of substantially identical processing units often share a system memory and various input/output devices over a common bus. The sharing of a common bus, such as a system bus, allows the resources of the processing units to be used in the most cost-effective manner. But at the same time, it is also important that data can be delivered to each processing unit over the system bus with minimum delays.

Given the fact that multiple processing units are sharing a common bus, an arbiter is required to arbitrate the order in which each processing unit can access the common bus. If the bus arbitration process is not efficiently performed by the arbiter, then many processing units will have to be in standby mode, waiting to send or to receive data from the common bus. As a result, the total bandwidth of the multiprocessor system will be reduced. The present disclosure discloses an improved method and apparatus for providing bus arbitrations in a multiprocessor system.

BRIEF SUMMARY OF THE INVENTION

In accordance with a preferred embodiment of the present invention, a computer system includes a common bus that is shared by multiple cores, such as processors. A history of bus requests for the common bus made by the cores is stored in a bus request history table. In response to bus request made by the cores, the common bus is arbitrated according to information stored in the bus request history table by an arbiter.

All objects, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is a detailed diagram of a bus request history table in the multiprocessor system from FIG. 1, in accordance with an alternative embodiment of the present invention;

FIG. 5 is an example usage of the bus request history table from FIG. 4; and

DETAILED DESCRIPTION OF THE INVENTION

Detailed Description of a Preferred Embodiment

Figure 1:
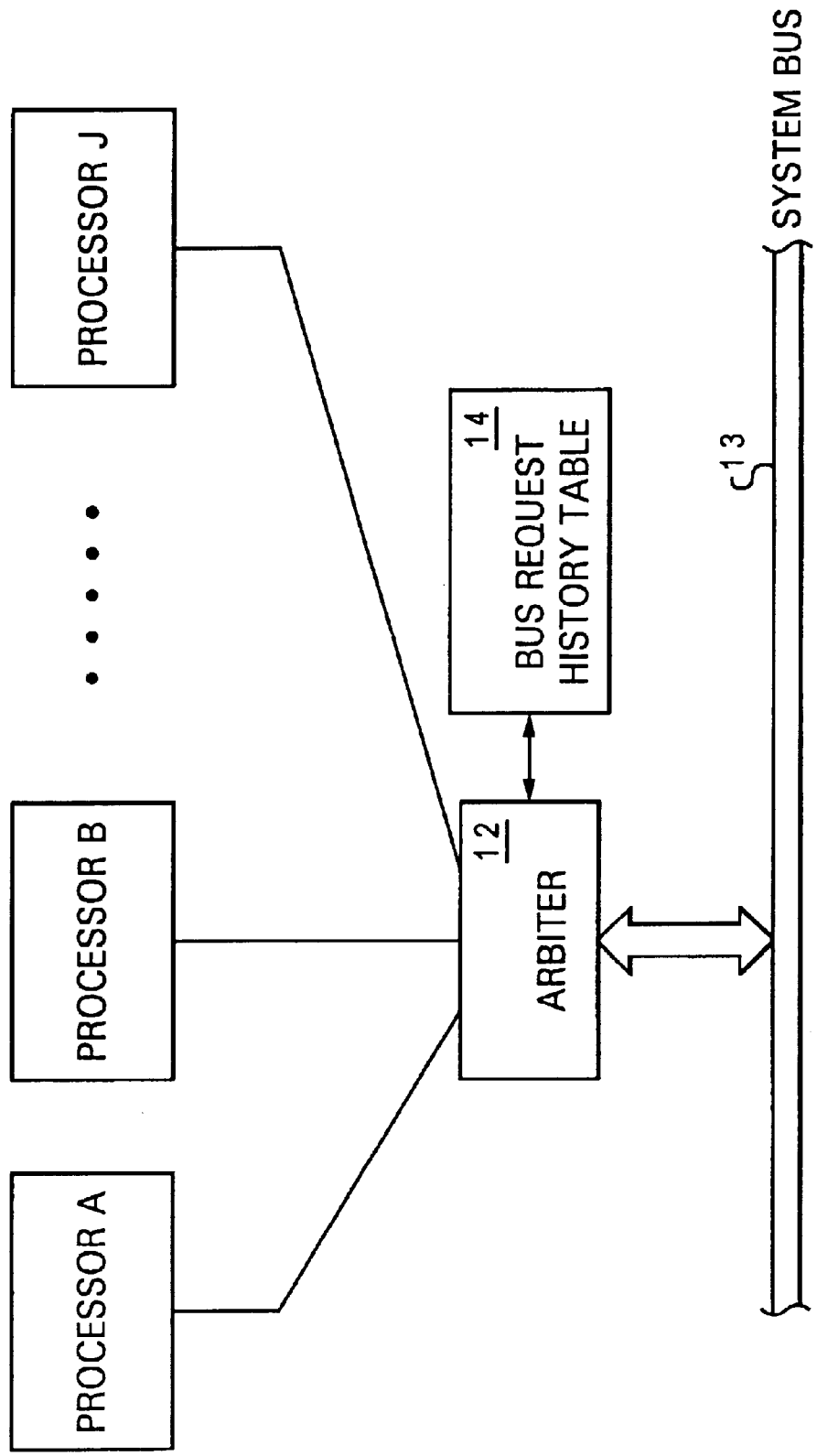
FIG. 1 is a block diagram of a multiprocessor system in which a preferred embodiment of the present invention can be implemented.

Referring now to the drawings and, in particular, to FIG. 1, there is depicted a block diagram of a multiprocessor system in accordance with a preferred embodiment of the present invention. As shown, a multiprocessor system 10 includes processors A–J. Each of processors A–J is coupled to a common system bus 13 via an arbiter 12. Arbiter 12 is also connected to a bus request history table 14. Bus request history table 14 can be implemented by a cache memory or a content-addressable memory, as will be further explained in details. Arbiter 12 grants bus accesses to each of processors A–J based on information provided by bus request history table 14.

Suppose, for example, that processor C always reads data from a cache memory within processor A, and then writes data back to the cache memory within processor A. Afterwards, processor B reads from the cache memory within processor A, processes the read data and then write the data back to the cache memory within processor A. Without knowing the above-mentioned pattern, arbiter 12 will wait for processor C to request system bus 13 and then grants system bus 13 to processor C. Then, processor A will request system bus 13, and arbiter 12 will grant system bus 13 to processor A, then grants system bus 13 back to processor C, and so forth. The arbitration process would have been faster if arbiter 13 already knew ahead of time that system bus 13 should be granted to processor A after processor C had requested system bus 13, because the transition time from processor C to processor A can be reduced. A performance hit occurs only when there is a misprediction.

A history table, such as bus request history table 14, can be used to store the above-mentioned information to be sent to arbiter 12 when necessary. With the stored information supplied by bus request history table 14, arbiter 12 can automatically grant system bus 13 to a particular processor as soon as system bus 13 becomes available. Bus request history table 14 also keeps track of any misprediction and the processor that actually requests system bus 13. When the number of misprediction exceeds a predetermined number, such as 3, the stored entry can be eliminated from bus request history table 14.

Figure 2:
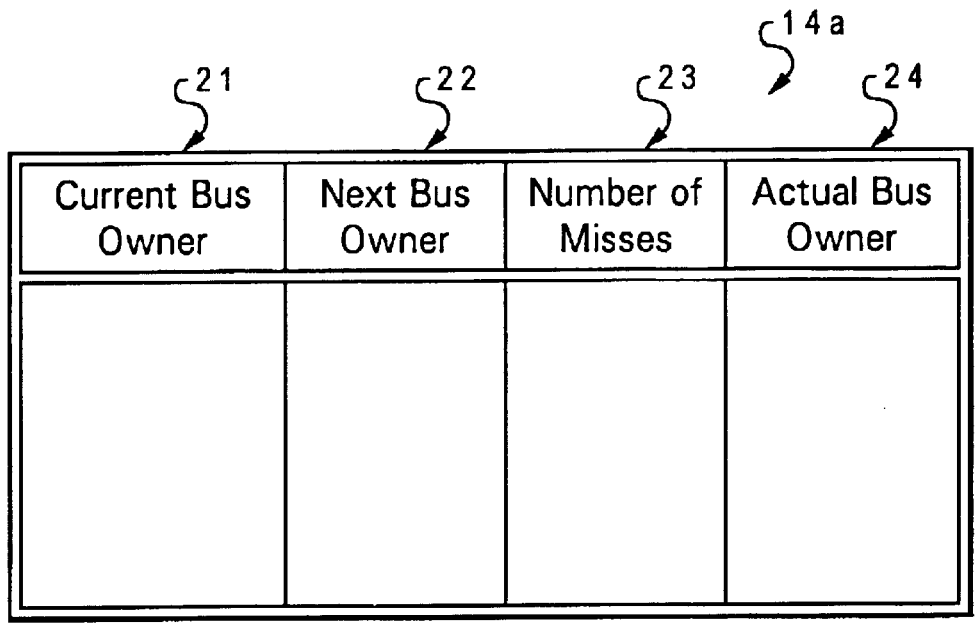
FIG. 2 is a detailed diagram of a bus request history table in the multiprocessor system from FIG. 1, in accordance with a preferred embodiment of the present invention.

With reference now to FIG. 2, there is illustrated a detailed diagram of bus request history table 14 (from FIG. 1), in accordance with a preferred embodiment of the present invention. As shown, a bus request history table 14a includes four columns, namely, a current bus owner column 21, a next bus owner column 22, a number of misses column 23, and an actual bus owner column 24. Each entry within current bus owner column 21 contains the name of a processor to which an arbiter (such as arbiter 12 from FIG. 1) should grant a common bus (such as system bus 13 from FIG. 1). Each entry within next bus owner column 22 contains the name of a processor to which the arbiter should grant the common bus immediately after the bus grant to the processor contained in current bus owner column 21. Every time the arbiter has "mispredicted" a bus grant (i.e., the processor that actually needs the common bus is not the name of the processor contained in next bus owner column 22), the number (which is initially reset to a zero) contain in number of misses column 23 is incremented by one. After a misprediction, the name of a processor that actually needs the common bus is ascertained, and the name of the processor is recorded in actual bus owner column 24.

Figure 3:
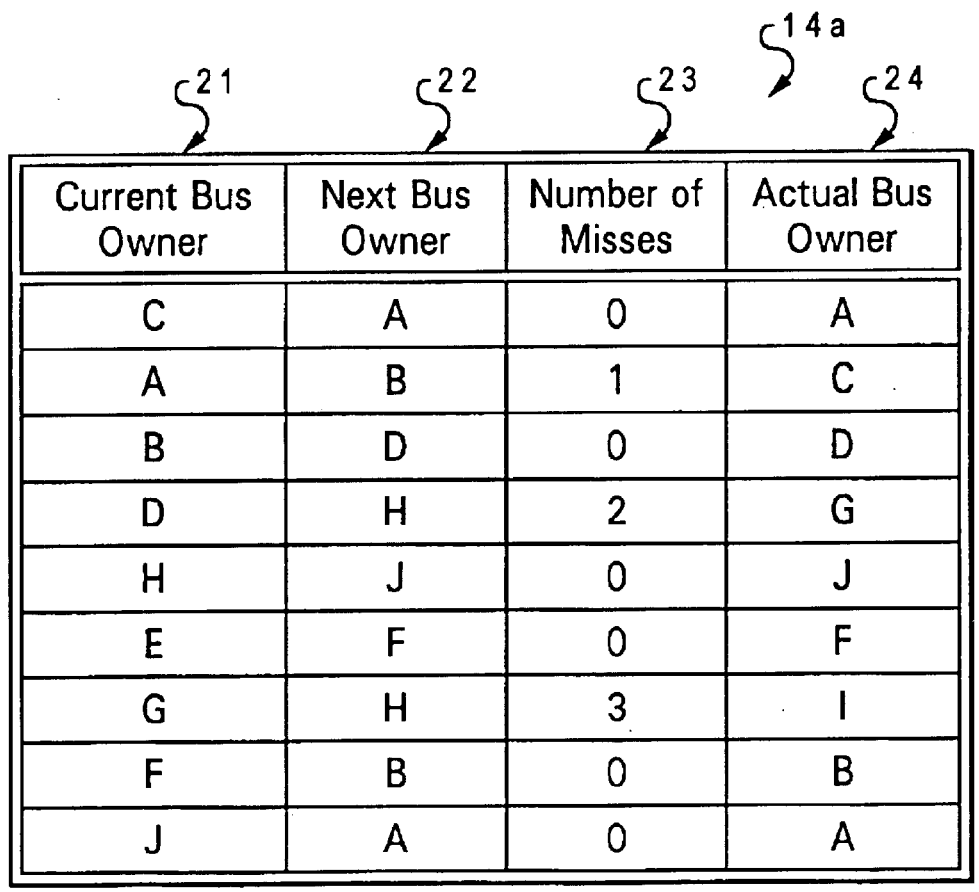
FIG. 3 is an example usage of the bus request history table from FIG. 2.

Referring now to FIG. 3, there is illustrated an example usage of bus request table 14a. As shown, current bus owner column 21 includes processors C, A, B, D, H, E, G, F and J in each respective row entry. Similarly, next bus owner column 22 includes processors A, B, D, H, J, F, H, B and A in each row entry corresponds to the row entry in current bus owner column 21. According to bus request table 14a, system bus 13 (from FIG. 1) should automatically be granted by arbiter 12 (from FIG. 1) to processor A after processor C has requested system bus 13, system bus 13 should automatically be granted to processor B after processor A has requested system bus 13, system bus 13 should automatically be granted to processor D after processor B has requested system bus 13, system bus 13 should automatically be granted to processor H after processor D has requested system bus 13, etc.

If any automatic bus grant according to next bus owner column 22 turns out to be incorrect (i.e., a misprediction), then the number in the corresponding row of number of misses column 23 is incremented by one, and the processor that actually requested system bus 13 is recorded in the corresponding row of actual bus owner column 24. For example, if the processor that actually requested system bus 13 after processor A is processor C instead of processor B as predicted in row 2 of next bus owner column 22, then the number in row 2 of number of misses column 23 is incremented by one, and processor C is recorded in row 2 of actual bus owner column 24. Similarly, if the processor that actually requested system bus 13 after processor D is processor G instead of processor H as predicted in row 4 of next bus owner column 22, then the number in row 4 of number of misses column 23 is now 2 (incremented from a previous 1), and processor G is recorded in row 4 of actual bus owner column 24. If the number in number of misses column 23 exceeds a predetermined number, then the entry will be removed from bus request history table 14a because of its unreliable predictability. For example, if the predetermined number for allowable misses is 3, then another misprediction for processor G will cause row 7 to be removed from bus request history table 14a. Accordingly, when there is not misprediction, the processor name stored in actual bus owner column 24 should be the same as the processor name stored in next bus owner column 22, such as rows 1, 3, 5–6 and 8–9.

With reference now to FIG. 4, there is depicted a detailed diagram of bus request history table 14 (from FIG. 1), in accordance with an alternative embodiment of the present invention. As shown, a bus request history table 14b includes five columns, namely, a current sequence number column 25, a processor sequence column 26, a next sequence number column 27, a number of misses column 28, and an actual processor sequence column 29. Each entry within current sequence number column 25 contains a unique sequence number. Each entry within processor sequence column 26 contains a name sequence of processors, which is associated with the unique sequence number, to which an arbiter (such as arbiter 12 from FIG. 1) should grant a common bus (such as system bus 13 from FIG. 1). Each entry within next sequence number column 27 contains the sequence number the arbiter should follow immediately after the arbiter has completed with the sequence contained in current sequence number column 25. Every time the arbiter has "mispredicted" a bus grant (i.e., the processor that actually needs the common bus is not the same as the sequence of processors contained in processor sequence column 26), the number (which is initially reset to a zero) contain in number of misses column 28 is incremented by one. After a misprediction, the actual name sequence of the processors that actually need the common bus is ascertained, and the actual name sequence is recorded in the corresponding row of actual processor sequence column 29.

Referring now to FIG. 5, there is illustrated an example usage of bus request table 14b. As shown, current sequence number column 25 contains sequence numbers 1, 2, 3, 4 and 5 in each respective row entry. Processor sequence column 26 contains processor sequences CACBA, BABDH, DADGE, HEHAC, and ACFEG in each row entry that corresponds to the row entry in current sequence number column 25. According to row 1 of bus request table 14b, system bus 13 (from FIG. 1) should automatically be granted by arbiter 12 (from FIG. 1) to processor A, then to processor C, then to processor B, then to processor A, after processor C has requested system bus 13. Similarly, according to row 2 of bus request table 14b, system bus 13 should automatically be granted to processors A, B, D, H, in this order, after processor C has requested system bus 13.

If any automatic bus grant according to current sequence number column 25 and process sequence column 26 turns out to be incorrect (i.e., a misprediction), then the number in number of misses column 28 is incremented by one, and the name sequence of processors that actually requested system bus 13 is recorded in actual processor sequence column 29. For example, if the sequence of processors that actually requested system bus 13 after processor B is processors ABDE instead of processors ABDH as predicted in row 2, then the number in number of misses column 28 is incremented by one, and the sequence of processors BABDE is recorded in actual bus owner column 29. Similarly, if the sequence of processors that actually requested system bus 13 after processor H is processors EHAB instead of processors EHAC as predicted in row, then the number in number of misses column 28 is now 2 (incremented from a previous 1), and the sequence of processors HEHAB is recorded in actual bus owner column 29. If the number in number of misses column 28 exceeds a predetermined number, then the entry will be removed from bus request history table 14b because of its unreliable predictability. For example, if the predetermined number for allowable misses is 2, then another misprediction for processor H will cause row 4 to be removed from bus request history table 14b. Accordingly, when there is not misprediction, the processor sequence stored in actual processor sequence column 29 should be the same as the processor sequence stored in next processor sequence column 27, such as rows 1, 3 and 5.

In addition, processor sequence column 26 and actual processor column 29 can also be modified to store the number of consecutive cycles that each processor requests the system bus. For example, row 1 of processor sequence column 26 may store additional information such as processor C for 1 cycle, then processor A for 1 cycle, then processor C for 2 cycles, then processor B for 3 cycles, and then processor A for 1 cycle.

Figure 6:
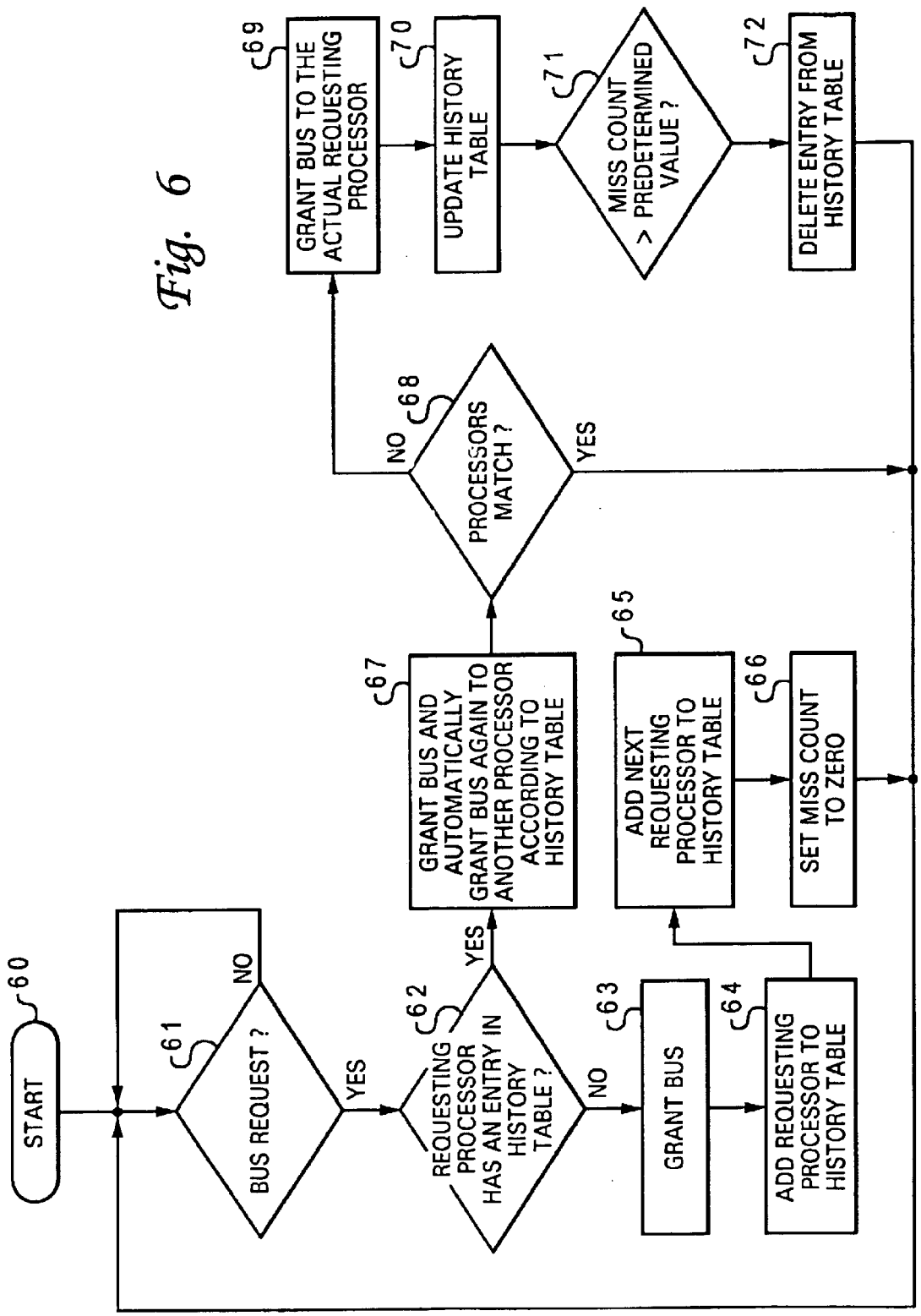
FIG. 6 is a high-level logic flow diagram of a method for providing bus arbitrations in a multiprocessor system, in accordance with a preferred embodiment the present invention.

With reference now to FIG. 6, there is illustrated a high-level logic flow diagram of a method for providing bus arbitrations in a multiprocessor system, in accordance with a preferred embodiment of the present invention. Starting at block 60, a determination is made as to whether or not there is a bus request by a processor, as shown in block 61. If there is a bus request, another determination is made as to whether or not the requesting processor has an entry within a current bus owner column of a bus request history table, as depicted in block 62. If the requesting processor has no entry within the current bus own column of the bus request history table, then the bus is granted to the requesting processor, as shown in block 63, and a new entry with the name of the requesting processor is added to the current bus owner column of the bus request history table, as depicted in block 64. After another bus request and bus grant (immediately following the bus request and bus grant from block 63), the name of the requesting processor for the another bus request is recorded in the corresponding next bus owner column as well as the corresponding actual bus owner column, as shown in block 65. The corresponding number of misses column is set to "0," as depicted in block 66.

Otherwise, if the requesting processor has an entry within the current bus owner of the bus request history table, then the bus is first granted to the requesting processor and then automatically granted to the processor having its name contained in a corresponding row of the next bus owner column of the bus request history table, as shown in block 67. Next, a determination is made as to whether or not the processor having the automatically granted bus matches the immediate subsequent requesting processor, as shown in block 68. If the processor having the automatically granted bus does not match the immediate subsequent requesting processor, then the bus is granted to the immediate subsequent requesting processor, as depicted in block 69. The corresponding row of the actual bus owner column and the number of misses column of the bus request history table are then updated with the correct immediate subsequent requesting processor and the new miss count, respectively, as shown in block 70. Then, a determination is made as to whether the miss count in the corresponding number of misses column is greater than a predetermined value, as shown in block 71. If the miss count is greater than a predetermined value, then the entry is deleted from the bus request history table, as shown in block 72.

As has been described, the present invention provides an improved method and apparatus for providing bus arbitrations in a multiprocessor system. Bus request history table 14a as shown in FIG. 2 is preferably implemented in a cache memory, and bus request history table 14b as shown in FIG. 4 is preferably implemented in a content-addressable memory. Although the method depicted in FIG. 6 is intended for bus request history table 14a, it is understood by those skilled in the art that the method can be modified to be used with bus request history table 14b. Furthermore, although processors are utilized to illustrate a preferred embodiment of the present invention, it is understood by those skilled in the art that the principle of the present invention is also applicable to any cores that share a common bus.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. An apparatus for providing bus arbitrations in a multiprocessor system, said apparatus comprising:

a bus request history table for storing a history of bus requests for a system bus made by a plurality of cores, wherein said bus request history table includes a current sequence number column, a processor sequence column, a next sequence number column, and a number of misses column, wherein said system bus is shared by said plurality of cores; and an arbiter, coupled to said bus request history table, for arbitrating said system bus among said plurality of cores in response to bus requests made by said plurality of cores, according to information stored in said bus request history table.

2. The apparatus of claim 1, wherein said bus request history table includes a current bus owner column, a next bus owner column, and a number of misses column.

3. The apparatus of claim 1, wherein said arbiter, in response to bus requests from a sequence of cores having an entry in said processor sequence column, automatically grants said system bus to a sequence of cores according to a corresponding entry in said next sequence number column after said bus requests.

4. The apparatus of claim 1, wherein said bus request history table is implemented by content-addressable memory.

5. The apparatus of claim 1, wherein said core is a processor.

6. The apparatus of claim 2, wherein said arbiter, in response to a bus request from a core having an entry in said current bus owner column, automatically grants said system bus to a core according to a corresponding entry in said next bus owner column after said bus request.

7. The apparatus of claim 2, wherein said bus request history table is implemented by a cache memory.

8. A method for providing bus arbitration in a multiprocessor system, said method comprising:

storing a history of bus requests for a system bus made by a plurality of cores in a bus request history table, wherein said bus request history table includes a current sequence number column, a processor sequence column, a next sequence number column, and a number of misses column, wherein said system bus is shared by said plurality of cores; and in response to bus requests made by said plurality of cores, arbitrating said bus requests according to information stored in said bus request history table.

9. The method of claim 8, wherein said bus request history table includes a current bus owner column, a next bus owner column, and a number of misses column.

10. The method of claim 8, wherein said arbitrating further includes automatically grants said system bus to a sequence of cares according to a corresponding entry in said next sequence number column after said bus requests, in response to bus requests from a sequence of cores having an entry in said processor sequence column.

11. The method of claim 8, wherein said core is a processor.

12. The method of claim 9, wherein said arbitrating further includes automatically grants said system bus to a core according to a corresponding entry in said next bus owner column after said bus request, in response to a bus request from a core having an entry in said current bus owner column.

13. The method of claim 9, wherein said bus request history table is implemented by a cache memory.

14. The method of claim 10, wherein said bus request history table is implemented by content-addressable memory.

* * * * *